United States Patent [19]

Saliba

[11] Patent Number: 5,949,604
[45] Date of Patent: Sep. 7, 1999

[54] METHOD OF WRITING AND READING SERVO ON TRACKS HAVING A LONGITUDINAL GAP

[75] Inventor: George A. Saliba, Northboro, Mass.

[73] Assignee: Quantum Corporation, Milpitas, Calif.

[21] Appl. No.: 08/661,576

[22] Filed: Jun. 11, 1996

Related U.S. Application Data

[63] Continuation of application No. 08/265,476, Jun. 24, 1994, abandoned, which is a continuation-in-part of application No. 08/222,491, Apr. 1, 1994, Pat. No. 5,371,638, which is a continuation of application No. 07/903,641, Jun. 24, 1992, abandoned.

[51] Int. Cl.$^6$ ............................. G11B 5/584; G11B 15/04
[52] U.S. Cl. ........................ 360/76; 360/60; 360/77.12; 360/78.02
[58] Field of Search ..................... 360/60, 77.12, 360/77.06, 78.02, 76

[56] References Cited

U.S. PATENT DOCUMENTS

| | | |
|---|---|---|
| 2,937,239 | 5/1960 | Garper et al. . |
| 3,292,168 | 12/1966 | Gray ........................................ 360/77.12 |
| 3,829,895 | 8/1974 | Tanaka et al. . |
| 3,919,697 | 11/1975 | Walker ............................. 360/77.12 X |
| 4,149,204 | 4/1979 | Marino et al. . |
| 4,321,634 | 3/1982 | Lehureau ................................... 360/70 |
| 4,334,252 | 6/1982 | Toriu . |
| 4,422,112 | 12/1983 | Tanaka ................................. 360/77.12 |
| 4,424,541 | 1/1984 | Koinuma et al. . |
| 4,439,793 | 3/1984 | Nater . |
| 4,472,750 | 9/1984 | Klumpp et al. ....................... 360/78.02 |
| 4,479,156 | 10/1984 | Kumagai et al. . |
| 4,502,082 | 2/1985 | Ragle et al. ............................... 360/76 |
| 4,539,615 | 9/1985 | Arai et al. . |
| 4,685,005 | 8/1987 | Fields, Jr. . |
| 4,802,030 | 1/1989 | Henry et al. . |
| 4,866,548 | 9/1989 | Rudi ..................................... 360/77.02 |
| 4,914,805 | 4/1990 | Kawase . |
| 4,953,161 | 8/1990 | Toyana ................................. 360/77.12 |
| 4,975,791 | 12/1990 | Eggebeen ............................. 360/77.01 |
| 4,979,051 | 12/1990 | Eggebeeb . |
| 5,121,270 | 6/1992 | Alcudia et al. ....................... 360/77.01 |
| 5,126,895 | 6/1992 | Yasuda et al. ........................ 360/77.07 |
| 5,132,861 | 7/1992 | Behr et al. ........................ 360/77.12 X |
| 5,223,994 | 6/1993 | Behr et al. ........................... 360/77.12 |
| 5,257,148 | 10/1993 | Solhjell et al. .................. 360/77.12 X |
| 5,285,331 | 2/1994 | White .................................. 360/77.12 |
| 5,307,217 | 4/1994 | Saliba ....................................... 360/76 |
| 5,371,638 | 12/1994 | Saliba .................................. 360/77.12 |

FOREIGN PATENT DOCUMENTS

| | | |
|---|---|---|
| 0 229732 | 1/1987 | European Pat. Off. . |
| 0 223 236 | 5/1987 | European Pat. Off. . |
| 59-100 678 | 10/1984 | Japan . |

*Primary Examiner*—Aristotelis M. Psitos
*Assistant Examiner*—James L Habermehl
*Attorney, Agent, or Firm*—David B. Harrison; John C. Chen

[57] ABSTRACT

A method of adjusting the lateral position of writing on a magnetic tape. Alternate data and servo information is recorded in a first track at a first azimuth angle, the first track including a longitudinal gap such that the first track includes a first lateral portion and a second lateral portion. Alternate data and servo information is recorded in a second track at a second azimuth angle, the second track including a similar longitudinal gap, the second track being written over the first track such that the first portion of the first track remains on the tape. The gap in the second track is positioned such that the alternate data and servo information written in the second portion of the first track is exposed by the gap in the second track. Alternate data and servo information is similarly written in a third track at the first azimuth angle, the third track including a similar gap. The third track is written over the second track such that part of the first portion of the second track remains on the tape, and such that the lower portion of the third track is written at a lateral position overlapping the second portion of the first track. Writing is interrupted at a position coinciding with servo information from the first track, and the amplitude of servo information is read. The amplitude is compared with a reference amplitude the lateral position of writing in the third track is adjusted in response to the comparison.

10 Claims, 8 Drawing Sheets

METHOD OF WRITING AND READING SERVO ON TRACKS HAVING A LONGITUDINAL GAP

REFERENCE TO RELATED APPLICATION

This is a continuation of application Ser. No. 08/265,476 filed on Jun. 24, 1994, now abandoned which is a continuation-in-part of U.S. patent application Ser. No. 08/222,491 filed on Apr. 1, 1994, now U.S. Pat. No. 5,371,638, which is a continuation of U.S. patent application Ser. No. 07/903,641 filed on Jun. 24, 1992, now abandoned.

BACKGROUND OF THE INVENTION

This invention relates generally to magnetic storage devices and particularly to servo methods for magnetic tape recording systems.

The constantly increasing operational speeds of digital computers are creating a demand for corresponding increases in the data storage capacities of magnetic tape recording and reproducing systems, while maintaining the special requirements of high speed digital tape systems.

Tape recording and reproducing systems for use as computer data storage devices are required to provide high data transfer rates and to perform a read check on all written data. To satisfy these requirements, conventional tape systems typically employ methods of recording known as linear recording, in which the tracks of data lie parallel to each other and to the edge of the tape, or helical scan recording, in which the tracks of data lie parallel to each other but diagonal to the edge of the tape. The linear recording method offers higher data transfer rates; however, it is desirable to obtain higher data densities while retaining the advantages of this method. Various methods of increasing tape track densities have therefore been pursued.

A method of recording known as azimuth recording has been used in helical scan recording system, and has recently been applied in linear tape systems to increase the track density of these systems. Azimuth recording results in a recorded track pattern in which the magnetization directions of adjacent data tracks lie at different azimuth angles to each other. This method greatly reduces inter-track crosstalk, allowing tracks to be placed closer together. The need for guard band spaces between tracks or wide write heads is thus reduced or eliminated.

Tape track densities are further limited, however, by lateral tape motion, which is the random and unavoidable tendency for a tape to drift in a direction lateral to the direction of tape motion. During a tape write, lateral tape motion causes track directions to deviate from the parallel to the edge of the tape. During a read, lateral tape motion causes misregistration of the read head over the track being read. This misregistration results in read data error. Further error can be introduced by lateral motion of the write head during writing.

Servo tracking techniques have been developed to reduce the effects of tracking error and thus improve the data capacity of tape systems. Known servo techniques vary widely, but most involve methods of dynamically moving the read head to continually re-position it over the written data track. The movement of the read head gap compensates for lateral tape motion during a read. However, lateral tape motion during writing is usually not compensated for with respect to the write head; thus, the distance between tracks is still limited to the magnitude of the lateral tape motion in order to avoid over-writing previously written tracks. Known servo techniques are also costly in that they may require the use of pre-formatted tapes or additional heads.

One method of compensating for lateral tape motion during writing involves embedding low frequency servo bursts within the tracks and then using the servo bursts in an adjacent previously written track to control the lateral position of writing a current track. Writing continues during the reading of a first servo burst, and is discontinued during the reading of a second servo burst. The difference in amplitude received from the servo burst reads indicates the proximity of the write head to the previously written track, and the position of writing can be adjusted in response.

This method, however, requires that the read head be capable of discerning servo information in adjacent tracks. The low frequency nature of the servo bursts renders them discernible, but requires the use of a second read channel in addition to the data read channel. Furthermore, relatively complex hardware must be employed to interrupt writing over some servo bursts while continuing writing over others, and to store the information being read for a later comparison.

It is desirable to provide a simplified, low cost servo tracking mechanism to control the effects of tracking error during writing in order to further increase track density. It is then possible to provide a tape system suited for computer data applications in which the data capacities are greatly increased over those of the prior art.

SUMMARY OF THE INVENTION

In accordance with the present invention, there is provided a method which achieves very high track density through the use of a servo during writing, while satisfying the requirements of computer data applications.

According to one aspect of the present invention, a method of writing information on a magnetic medium is provided. According to this method, alternate data and servo information is written in a first longitudinal area on the magnetic medium at a first azimuth angle. The first longitudinal area includes a longitudinal gap such that the first longitudinal area comprises a first lateral area portion and a second lateral track portion. Alternate data and servo information is then written in a second longitudinal area on the magnetic medium at a second azimuth angle, the second longitudinal area including a longitudinal gap. The longitudinal gap is such that the second area comprises a first lateral track portion and a second lateral track portion. The second area is written over the first area such that the first track portion of the first area remains on the tape. The longitudinal gap in the second area is positioned such that the alternate data and servo information written in the second track portion of the first area is exposed by the longitudinal gap in the second area.

This method of writing contributes to another aspect of the invention, which provides servo tracking during writing. Accordingly, after the first and second areas are recorded as previously described, alternate data and servo information is written in a third longitudinal area on the magnetic medium at the first azimuth angle. The third longitudinal area includes a longitudinal gap, the longitudinal gap being such that the third longitudinal area comprises a first lateral track portion and a second lateral track portion. The third area is written over the second area such that part of the first track portion of the second area remains on the tape, and such that the lower track portion of the third area is written at a lateral position overlapping the second track portion of the first area. Writing of the third area is interrupted at a position coinciding with the servo information from the first area. The amplitude of servo information is then compared with a reference amplitude indicating a predetermined lateral relationship between areas. The lateral position of writing in the third area is then adjusted in response to the comparison when said comparison falls outside a tolerance differential about the reference amplitude to bring the third area into the predetermined lateral relationship with the second area.

These aspects of the invention are combined to provide a very high track density magnetic tape recording system.

DETAILED DESCRIPTION OF THE PREFERRED EMBODIMENT

Figure 1:
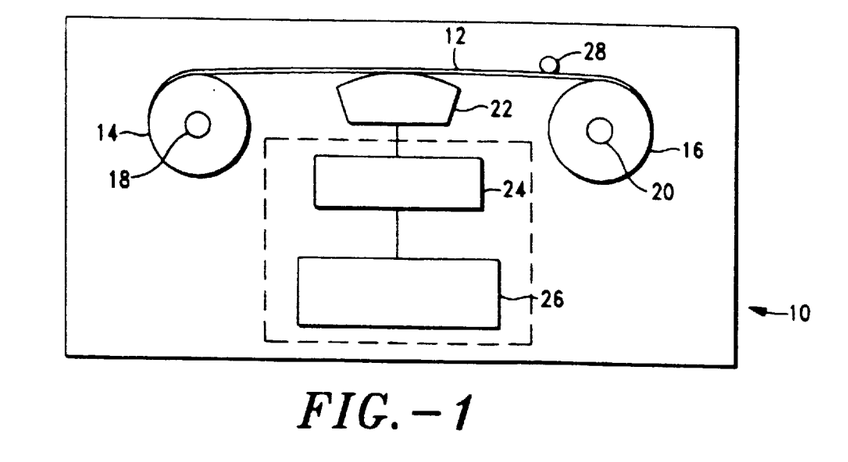
FIG. 1 is a schematic view of a magnetic tape system according to the principles of the invention.

FIG. 1 shows a magnetic tape system 10 for azimuth recording at very high track densities on a magnetic tape 12. The tape reels 14 and 16 are mounted on rotatably driven reel drive motors 18 and 20. The reel drive motors 18 and 20 rotate the reels 14 and 16 to move the tape 12 in a forward direction from the reel 14 to the take-up reel 16. As the tape 12 advances, it moves across the magnetic head structure 22, which writes linear tracks of data onto the tape 12. The magnetic head structure 22 contains separate write and read head gaps, allowing read checking of written data. When the entire length of the tape 12 has been transferred from the tape reel 14 to the reel 16, the direction of rotation of the reel drive motors 18 and 20 is reversed. The tape 12 now advances across the magnetic head 22 in the reverse direction. As the tape 12 begins to advance in the reverse direction, the magnetic head structure 22 is stepped in a lateral direction across the tape by the magnetic head positioner assembly 24, enabling the recording and read checking of another track of information on the tape 12. A controller 26 provides data to be written by the magnetic head structure 22, accepts read data from the magnetic head structure 22, and provides control information to the head positioner assembly 24. The advancement of the tape 12 continues in forward and reverse directions with the magnetic head structure 22 stepped laterally across the tape 12, resulting in multiple parallel recorded tracks. The position of the magnetic head structure 22 relative to the lengthwise location on the tape 12 is continuously monitored by position sensing means such as an optical tachometer 28. (As used herein, the term "longitudinal" relates to the forward and reverse direction of tape travel, whereas "lateral" refers to the direction across the tape).

Very high track densities are obtained through the interaction of a magnetic head like the magnetic head structure 22 of FIG. 2, which enables efficient azimuth recording, and a servo, to be described in more detail hereinafter. In FIG. 3 there is shown a pattern of recorded tracks 30, 32, 34, and 36 resulting from the use of the tape system 10 of FIG. 1.

According to the principles of the invention, the tracks 30 and 32 include alternate data and servo blocks 38 and 40 respectively. The data 38 and servo blocks 40 in tracks 30 and 32 are written at a first azimuth angle 0+ relative to the lateral direction of the tape 12. Tracks 34 and 36 also include alternate data and servo blocks 38 and 40, but the data 38 and servo blocks 40 in tracks 34 and 36 are written at the second azimuth angle 0−. The servo blocks 40 are interspersed in the data 38 of the tracks 30, 32, 34, and 36, at locations as determined by tachometer 28 of FIG. 1.

Figure 2:
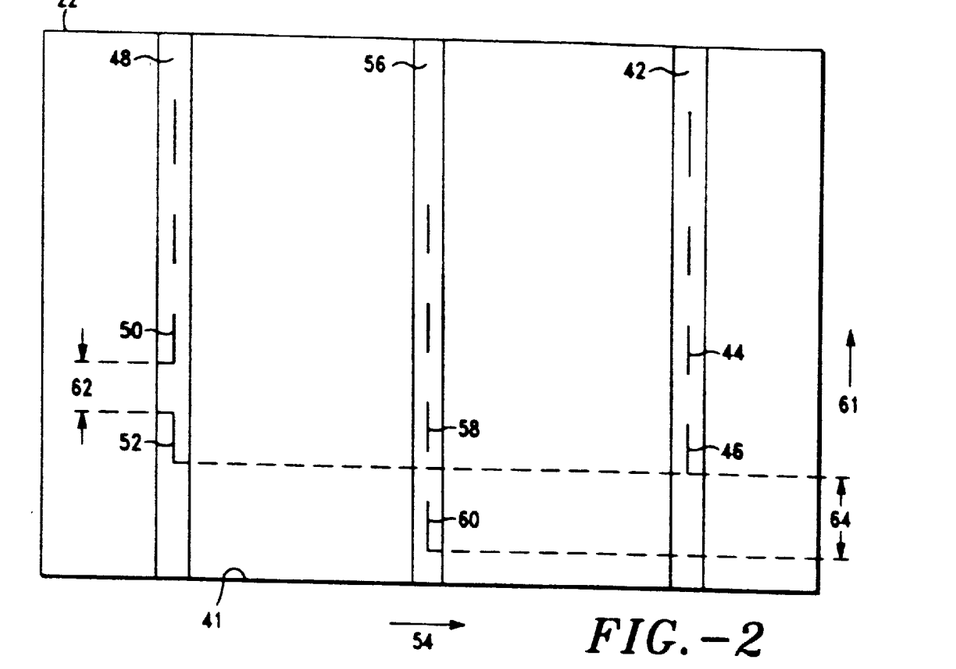
FIG. 2 is a schematic representation of a head arrangement of one embodiment of a magnetic head according to the principles of the invention.
Figure 3:
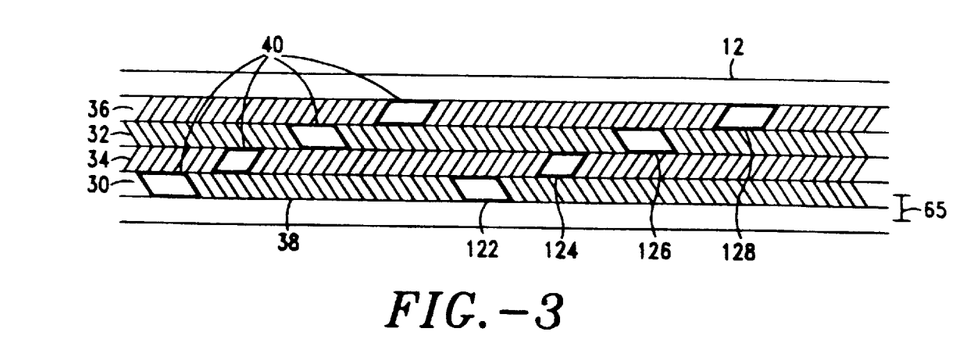
FIG. 3 is an enlarged section of recorded magnetic tape, displaying an azimuth track pattern with embedded servo blocks.

The azimuth recording shown in FIG. 3 is achieved through utilization of a magnetic head like the magnetic head structure 22 of FIG. 2. Referring to FIG. 2, the surface 41 of the magnetic head structure 22 contains a first column 42 of laterally spaced apart write heads including write heads 44 and 46, a second column 48 of laterally spaced apart write heads including write heads 50 and 52 spaced longitudinally from the first column as shown by the arrow 54, and a third column 56 of laterally spaced apart read heads including read heads 58 and 60 situated between the columns 42 and 48. The heads of each column are arranged such that their gap lengths extend in a lengthwise or lateral direction generally parallel to the direction of the arrow 61, as shown in FIG. 2. The write heads 44 and 46, the write heads 50 and 52, and the read heads 58 and 60 are arranged such that there is an end-to-end space 62 between them. Further, the corresponding heads in the two columns 42 and 48 are placed such that the write heads 50 and 44 are generally longitudinally aligned, and the write heads 52 and 46 are generally longitudinally aligned. The read heads 58 and 60 are in the third column 56 are offset in a lengthwise lateral direction and distance 64 from the corresponding write heads in the other two columns 42 and 48. Though in the embodiment shown each column includes four heads, and thus four tracks may be written at once, it is understood that any number of heads can be provided per column.

Figure 2A:
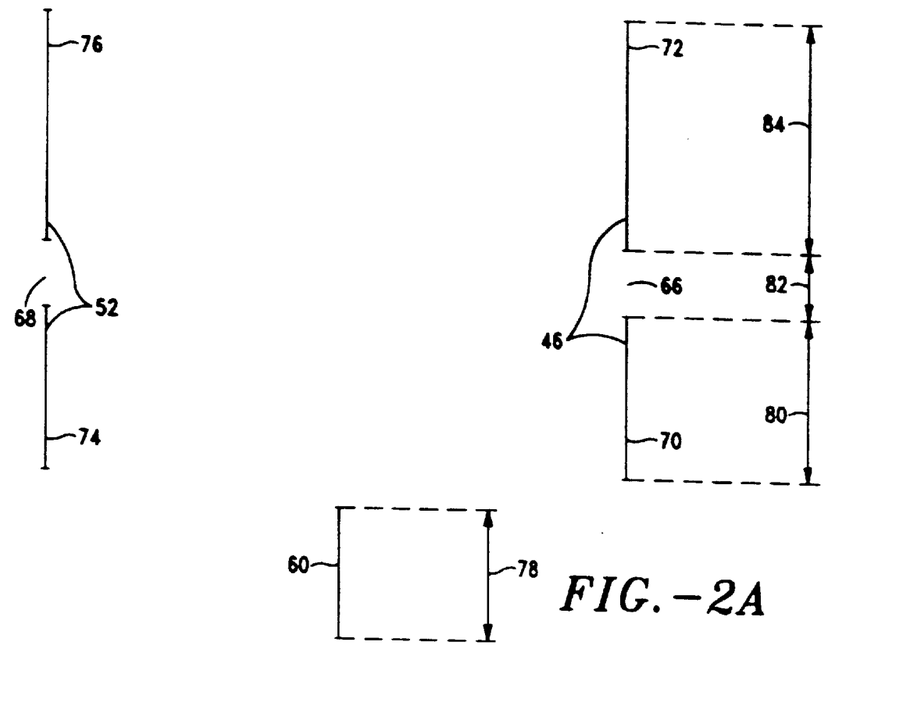
FIG. 2A is an expanded view of one row of heads on the magnetic head shown in FIG. 2.

Referring now to FIG. 2A, there is shown an expanded view of the write heads 46 and 52 and the read head 60 of FIG. 2. The write heads 46 and 52 include spaces 66 and 68 respectively separating the write head 46 into a lower write head 70 and an upper write head 72, and likewise separating the write head 52 into a lower write head 74 and an upper write head 76. The write head 46 may be manufactured by methods known in the art as a single core having a gap 66; alternatively, it may be manufactured as two separate cores 70 and 72. The write head 52 may be similarly manufactured.

In one embodiment provided for operation with a standard 0.5 inch magnetic tape, the length 78 of the read head gap 60 is approximately 2.0 millinches +/−0.2 millinches. The length 80 of the gapes of the lower write heads 70 and 74 is approximately 2.5 millinches +/−0.2 millinches. The length 82 of the spaces 66 and 68 is approximately 1.5 millinches +/−0.2 millinches. The lengths 84 of the upper write heads 72 and 76 is approximately 4 to 5 millinches, and can range anywhere between 2 millinches and 8 to 10 millinches. The offset 64 is approximately 100 millinches. With this arrangement a track pitch of approximately 1.5 millinches is provided. (FIG. 3, 65)

Of course, different dimensions can be employed for operation in different magnetic media environments and to provide different track pitches, the dimensions herein given by reason of example only.

Figure 4:
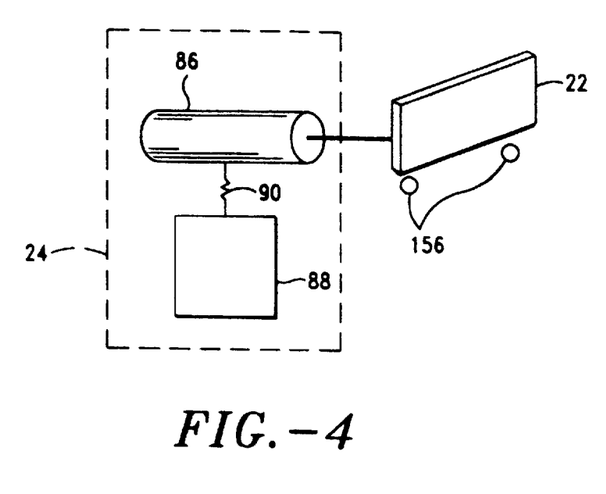
FIG. 4 is a detailed view of the components of the head assembly of FIG. 1.

Referring to FIGS. 1 and 4, magnetic head structure 22 is mounted on the head positioner assembly 24, shown in dashed lines in FIG. 4, for lateral and stepped rotatable movement relative to the tape 12. As shown, the magnetic head structure 22 is mounted for movement about the output shaft of a rotary motor 86. The rotary motor 86, which receives input from the controller 26, serves to rotatably step the magnetic head 22 angularly relative to the tape 12. A stepper motor 88, which also receives input from controller 26, serves to engage an actuator 90, shown as a linear actuator in FIG. 4, for moving the magnetic head structure 22 in a lateral or widthwise direction across the tape 12. The stepper motor 88 and the linear actuator 90 are used to adjust the track to track position of magnetic head structure 22. The rotary motor 86 is used for coarse and fine adjustment of the angle of the magnetic head structure 22 relative to the azimuth angle of a given track.

According to the implementation shown, the stepper motor 88 is capable of 1200 steps/sec at 1.8 degrees/step +/−5%. The linear actuator 90 can be either a lead screw type, advancing 100 microinches per half step, or a microstepper. The rotary motor 86 may be implemented either as a gear type DC motor, a stepper motor, a microstepper, or a torque or rotary motor. Because the tape 12 is stopped when the tape system 10 is not in operation, no sample data is available. It is impractical to recalibrate after every stop; therefore, the gear motor is presently the best suited, as the motor is required to hold a preset angular value for a time without a large amount of drift. Alternatively, the rotary motor can be implemented as a rotary actuator with secondary feedback; for example, an optical sensor, in order to hold angular position. Of course, other methods of stepping and rotating the head 22 may be employed to obtain satisfactory results within the principles of the The head assembly 24 is used to position the magnetic head structure 22 with the particular write and read head gap arrangement shown in FIG. 2 to provide the resultant recording pattern on the tape 12 shown in FIG. 3. According to the principles of the invention, some of the servo blocks 40 residing in the track 32 were written during the writing of a previously written track 30, and are used to control the position of writing of the track 32. The methods of writing the tracks and of controlling the position of writing subsequent tracks will now be described.

Figure 5:
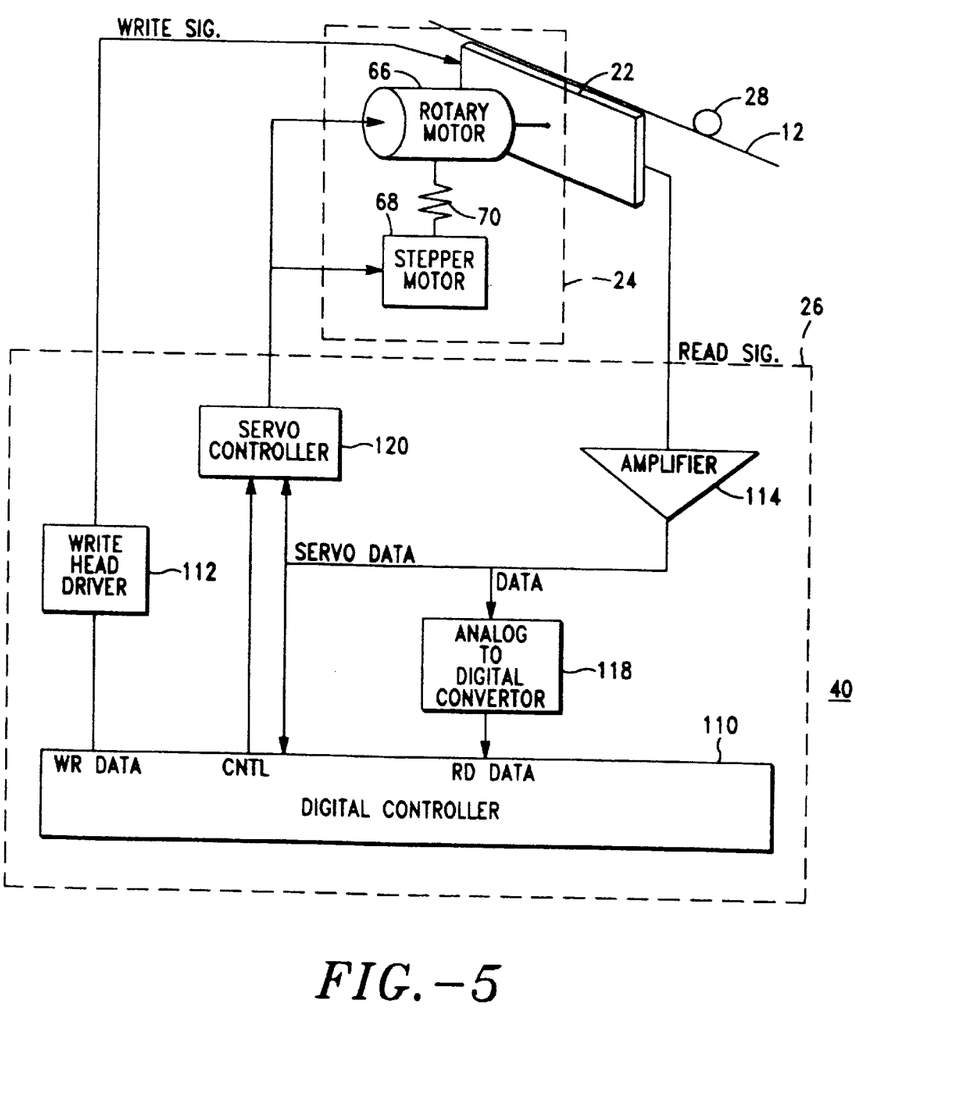
FIG. 5 is a detailed block diagram of the servo for the tape system of FIG. 1.

Referring to FIG. 5, a servo 100 according to the principle of the invention is shown for the tape system 10 of FIG. 1. Controller 26 includes a digital controller 110, a write head driver 112, an amplifier 114, an analog to digital converter 118, and a servo controller 120. The digital controller 110, implemented by means such as a microprocessor, directs the reading and writing of data on the tape 12. To write data, the digital controller 110 outputs digital data to a write head driver 112, which is a digital to analog converter. The write head driver 112 outputs in turn a write signal to the magnetic head 22. The read signal received by the magnetic head 22 from the tape 12 is amplified by an amplifier 114. The amplified output of the amplifier 114 is in turn coupled to an analog-to-digital converter 118 via a path 115 the digital output of which is coupled to a read data input of the digital controller 110. The digital controller 110 processes the data and forwards it to a requesting host, such as a mainframe computer system or server. The amplified output of the amplifier 114 is also coupled to a servo controller 120, which recognizes servo information and senses its signal level. Control information, representing such factors as write/read condition and tape direction, is also input to the servo controller 120 via a path 111 from the digital controller 110. Servo controller 120 interprets the servo information from the amplifier 114 and the control information inputs from the digital controller 110, and generates output control signals which are coupled to the rotary motor 66 via path 121 and the stepper motor 68 via path 123 of the head assembly 24 for movement of the magnetic head 22 relative to the tape 12.

According to the principles of the invention, the servo system can be used to correct for two different sources of error in head positioning during writing; unwanted lateral motion of the write head during writing, and lateral tape motion (LTM).

Referring back to FIG. 3, as the magnetic head structure 22 writes data along a track, intervals of servo information 122, 124, 126, or 128 are recorded amidst the data. During reading or recording of a given track, the read head 60 (FIG. 2) is not subject to interference or cross talk due to the data recorded in the previously recorded adjacent track because the data is at a different azimuth angle and thus its signal strength is greatly attenuated. Adjacent tracks can therefore be recorded very close together. The servo controller 120 uses the servo information recorded in the tracks to drive the head assembly 24 in order to control the lateral position of the magnetic head 22 while writing tracks, as will be further described.

Figure 6:
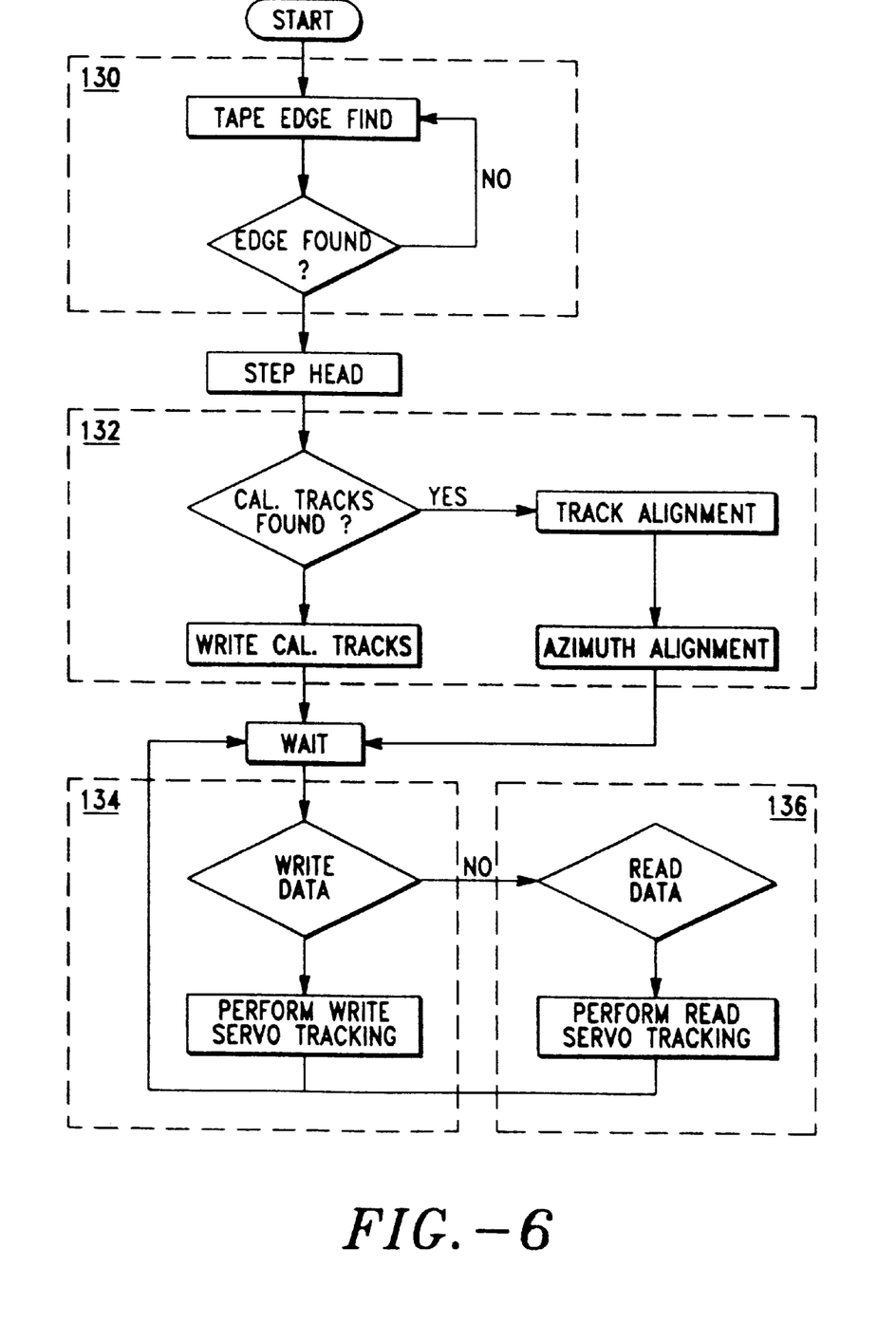
FIG. 6 is a general flow chart of the operation of tape system according to the principles of the invention.

As shown in the flowchart of FIG. 6, tape system operation begins with a tape edge find operation, followed by a calibration operation, followed by write and read operations.

Referring to block 130 of FIG. 6, tape system operation begins with a tape edge find operation. The magnetic head 22 is initially positioned off the edge of the tape 12. It is stepped toward the tape until it can successfully reproduce, beyond a predetermined noise threshold, data it attempts to write.

After the edge of the tape 12 has been found, the tape 12 is calibrated, as shown in block 132. The servo controller 120 directs the magnetic head 22 to look for calibration tracks which exist if the tape has been written. The magnetic tape 22 is stepped a pre-determined distance from the edge of the tape. If the head is blank, calibration tracks are not found, therefore, calibration tracks are to be written in the calibration area at the beginning of the tape. These calibration tracks are used for lateral alignment with track 0 (the first track written on the tape) and for azimuth alignment which may be necessary between tapes and heads of different systems.

Write Servo

The description of the write servo describes movement of the magnetic head 22 laterally relative to tape travel as shown in the accompanying figures; i.e. "upwards" and "downwards", for purposes of convenience. It is understood that the directions and azimuth angles described can be reversed while maintaining the advantages of the invention.

Figure 7:
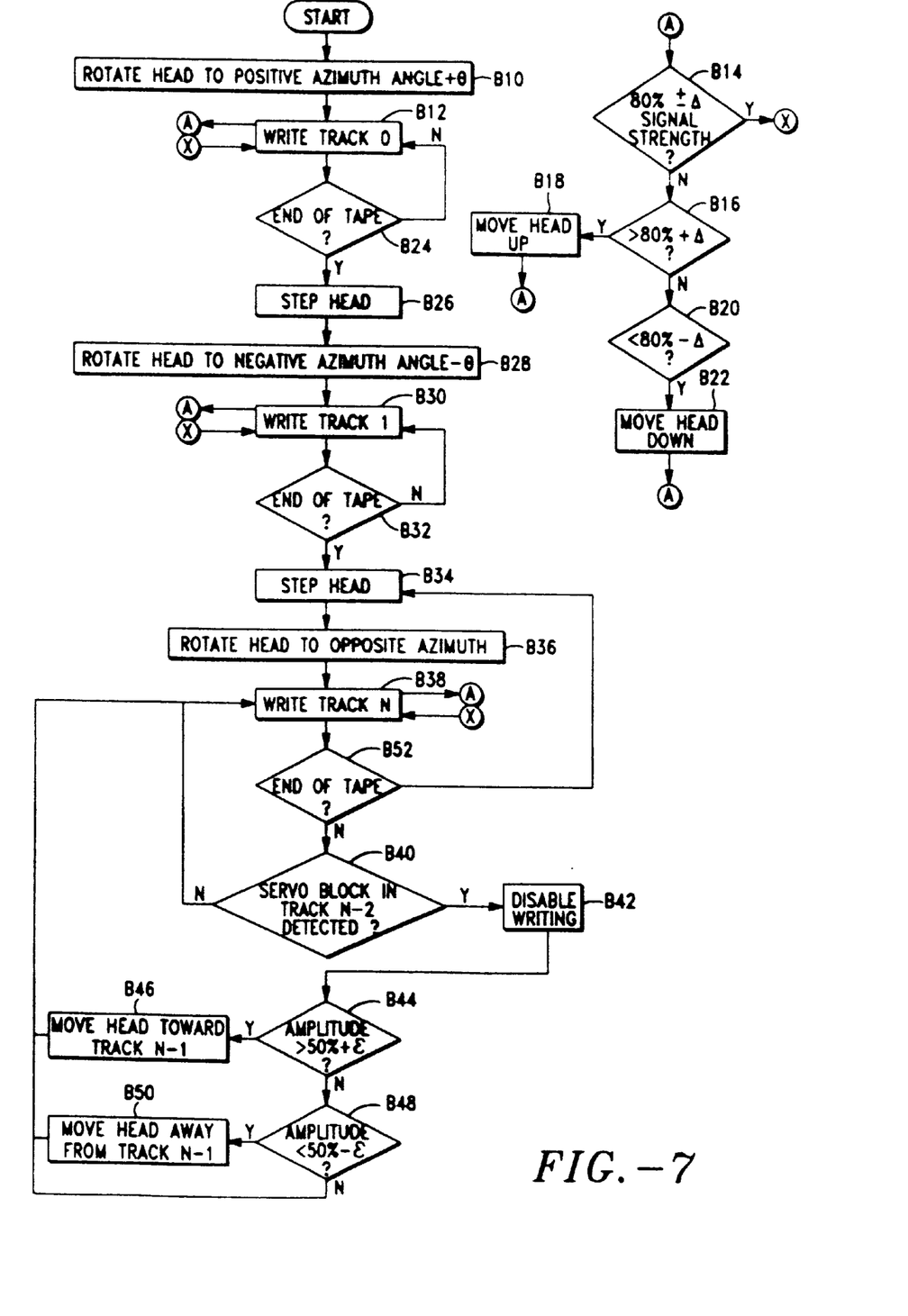
FIG. 7 is a detailed flow chart of the write servo block of FIG. 6, showing the operation of the write servo according to the principles of the invention.

After the tape system 10 has been calibrated, the tape 12 is written. FIG. 7, a detailed representation of block 134 of FIG. 6, presents a flow diagram of the operation of the write servo. FIGS. 8–11 are views of the positioning of the read head 60 and write heads 46 and 52 of the magnetic head 22 relative to the tracks being written. For ease of description, only one row of heads on the magnetic head 22 is shown reading and writing a single track, though it is understood that the servo according to the invention functions in the same manner with the use of a multi-track head structure 22 such as that shown in FIG. 2.

Figure 8:
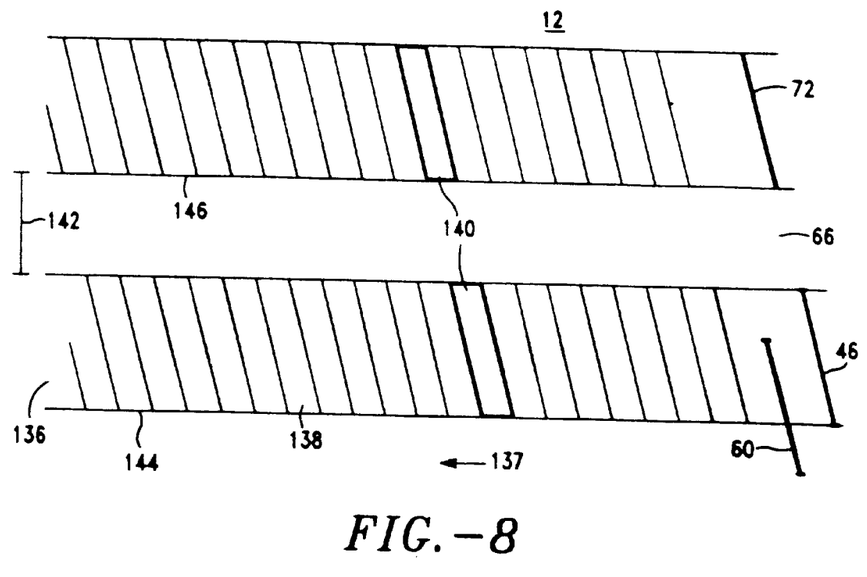
FIG. 8 is a schematic representation of the process of writing an initial track according to the principles of the invention.
Figure 9:
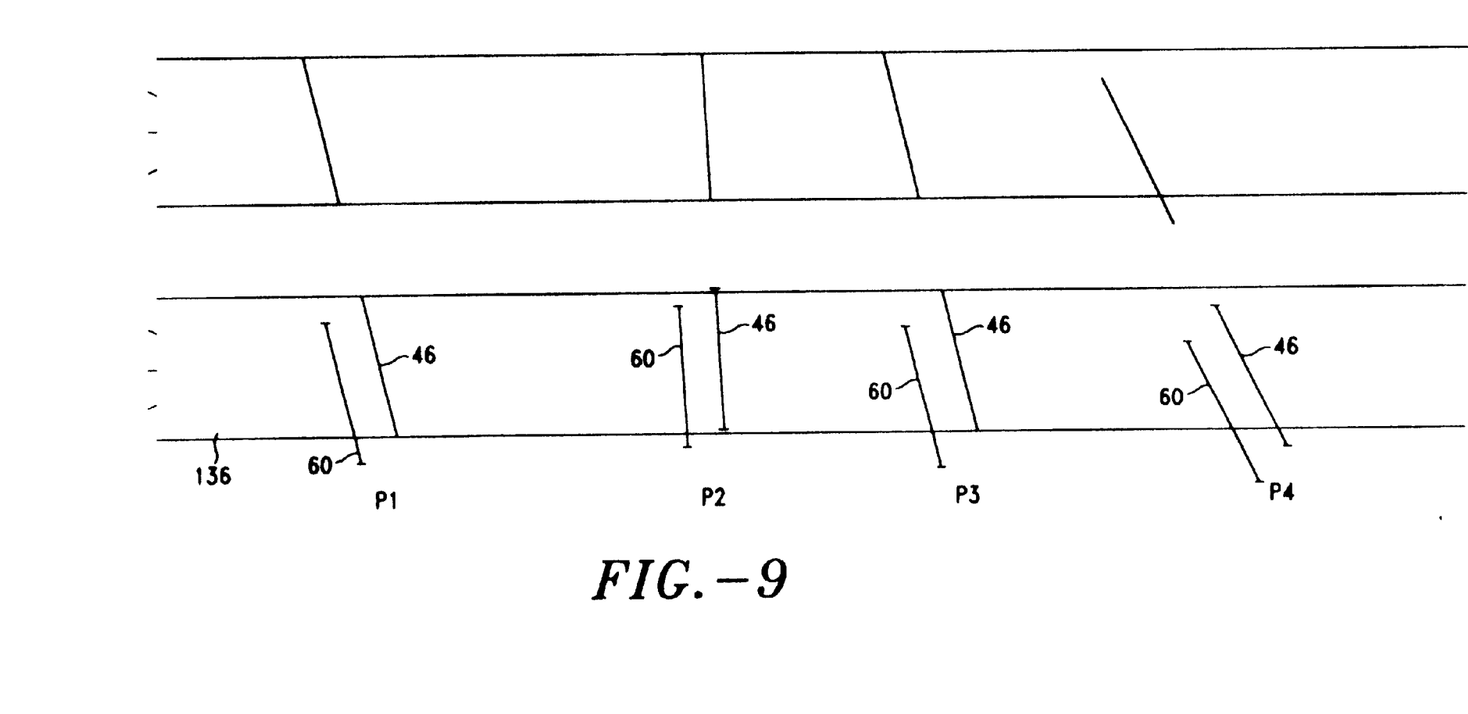
FIG. 9 is a schematic representation of the head assembly position adjustments made according to a type of write servo.

Referring to FIGS. 7 and 8, after the track 0 location is determined through the calibration method previously described, a first longitudinal data area 136 is written open loop, under no servo control, at this lateral position. Accordingly, the magnetic head 22 is rotated to a positive azimuth angle 0 (FIG. 7 B10) against a preset position stop 156 (shown in FIG. 4), bringing the read head 60 and write head 46 into general azimuth alignment, and the tape 12 is driven past the magnetic head 22 in the forward direction 137. Area 136 is written to contain intervals of data 138 and intervals of servo tracking information 140 at the positive azimuth angle 0+ (B12). The servo intervals 140, or blocks, are inserted amidst the area 136 data 138 at pre-determined intervals as indicated by the tachometer 28. Due to the gap 66 in the write head 46, a longitudinal gap 142 resides within the area 136, the gap 142 corresponding to the position gap 66 in the write head 46. The track 136 is thus divided into a lower track portion 144 and an upper track portion 146.

The servo blocks 140 are placed on the tape at intervals depending on the speed of linear advancement of the tape and the maximum expected frequency of the lateral tape motion, such that the sampling rate provided by the servo blocks is at least twice the lateral tape motion frequency; therefore, the servo block separation is at most V/2F, where V is tape speed and F is maximum lateral tape motion frequency. In a typical system, if the lateral tape motion frequency is on the order of 2 Hz and the tape speed is 100 in/s, the sampling frequency provided by the servo blocks must be at least 4 Hz, making the maximum separation of the servo blocks 25 inches.

During the writing of any area including area 136, the read head 60 checks the data written by the write head that is enabled—in this case, the write head 46. The signal strength of the data read an be used by the servo controller 120 (FIG. 5) to determine the position of the write head 46 relative to the read head 60, and thus the servo controller 120 can detect when the write head 46 has moved out of position. For example, referring to FIG. 9, when the write head 46 is properly positioned, approximately ⅘ of the read head 60 will overlap the lower track portion 70 of the write head 60 and the area 136 as seen at position P1, and the signal strength of the data read as evaluated by the servo controller 120 will be within some differential Δ of 80%. As the write head 46 writes area 132 at a positive azimuth angle 0+, it is possible for the head 22 to rotate out of position such that the write head 46 and read head 60 are positioned as shown at P2. In this case, the signal strength of the data being read by the read head 60 is greater than 80%, since more of the length of the read head 60 overlaps the area 136. The servo controller 120 compares the signal strength received to 80%±Δ, the Δ chosen being application specific (block B14). In this case, if the signal strength is greater than 80%+Δ (B16), the servo controller 120 will direct that the head 22 be rotated in a counterclockwise direction via the rotary motor 86 (FIG. 4) such that the write head 46 moves up relative to the read head 60 (B18). At position P3, the write head 46 and read head 60 are shown as being properly positioned. That is, ⅘ of the read head 60 overlaps the area 136, so the signal strength of the data will be evaluated as within a Δ of 80%. At position P3, the head structure 22 is shown to be rotated out of position such that less than half of the length of the read head 60 overlaps the area 136. In this case, if the signal strength of the data being written by the write head 46 is evaluated to be less than 80%−Δ (B20) the servo controller 120 will direct that the head 22 be rotated in a clockwise direction via the rotary motor 86 such that the write head 46 moves down relative to the read head 60 (B22). This servo method can be used during the recording of any area to adjust the position of the write head during writing.

Figure 10:
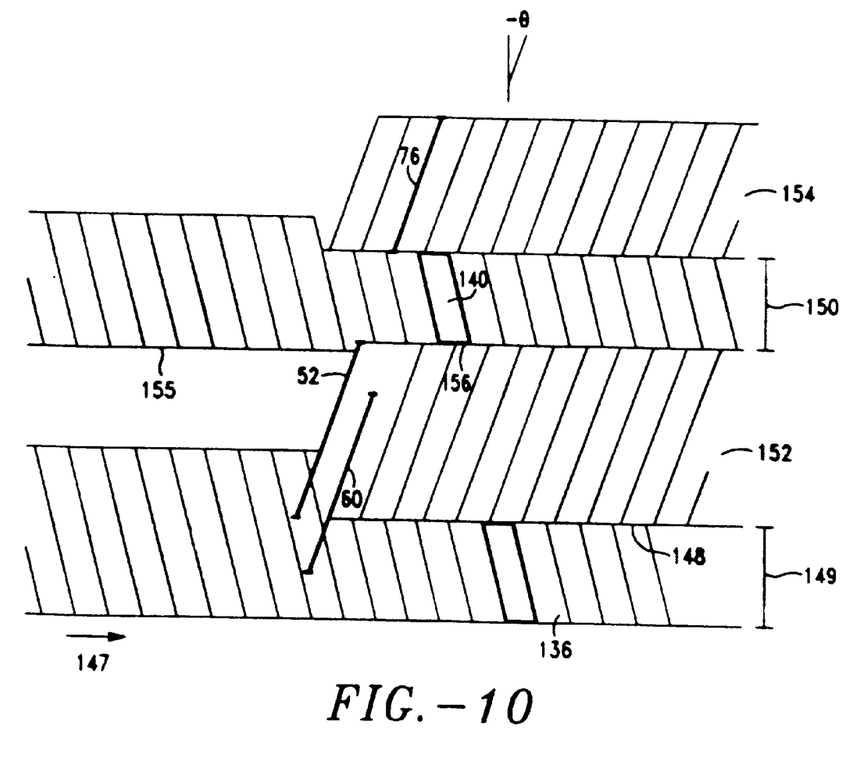
FIG. 10 is a schematic representation of the process of writing a second longitudinal area according to the principles of the invention.

Referring now to FIGS. 7 and 10, when the end of the tape is reached (FIG. 7 B24), the direction of travel of the tape 12 is reversed to advance in the direction indicated by the arrow 147. The stepper motor 88 activates the linear actuator 90 which moves the magnetic head 22 laterally over the tape 12 to the next longitudinal area position to be written (B26). The position at which the next area is to be written is chosen such that a portion of the previously written longitudinal area will be overwritten. According to the preferred embodiment, the next area 148 is positioned such that a longitudinal area pitch of 1.5 millinches results; therefore, approximately 40% of the width of the lower track portion 144 of the previously written area 136 will be overwritten, leaving an area 136 width 149 of approximately 1.5 millinches (See position P4 of FIG. 10). The write head 52 is then enabled to write a data pattern. As writing begins, the motor 86 rotatably steps the magnetic head 22 toward a negative position, bringing the write head 52 towards the previously recorded area track 136. When the read head 60 receives a signal strength from the data being written by the write head 52 that is within 80%±_ of a full track signal strength (blocks B14, B16, B18, B20, B22, and P6), the write head 52 is presumably correctly positioned, and writing of data in area 148 of an azimuth angle 0− commences (block B30). Servo blocks 140 are again written at positions as determined by the tachometer 28 at the azimuth angle 0−.

Like the first area 136, the second area 148 includes a longitudinal gape 150 resulting from the gap 68 in the write head 52, and is thus divided into a lower track portion 152 and an upper track portion 154. The gap 150 exposes data and servo information that was previously written by the upper track portion 72 of the write head 46 during the writing of area 136. The lower track portion 152 of area 148 overwrites part of the lower track portion 144 of the previously written first area 136, and overlaps the lower edge 155 of the upper track portion 146 of the first area 136. Thus, the lower edge 156 of servo information 140 residing in the upper track portion 146 of the first area 136 is affected by the position of writing of the lower track portion 152 of the second area 148. If the tape moves such that the second area 148 is written lower on the tape, the servo information 140 will be overwritten such that its lower edge 156 will be left lower on the tape. However, if the tape moves such that the second area 148 is written higher on the tape, the servo information 140 will be overwritten such that its edge 156 is higher on the tape. Thus, the lateral position of the lower edge 156 of the servo block 140 is set by the lateral position of writing of the area 148, and as such can be used to adjust the position of writing of subsequent tracks, as will be seen.

Figure 11:
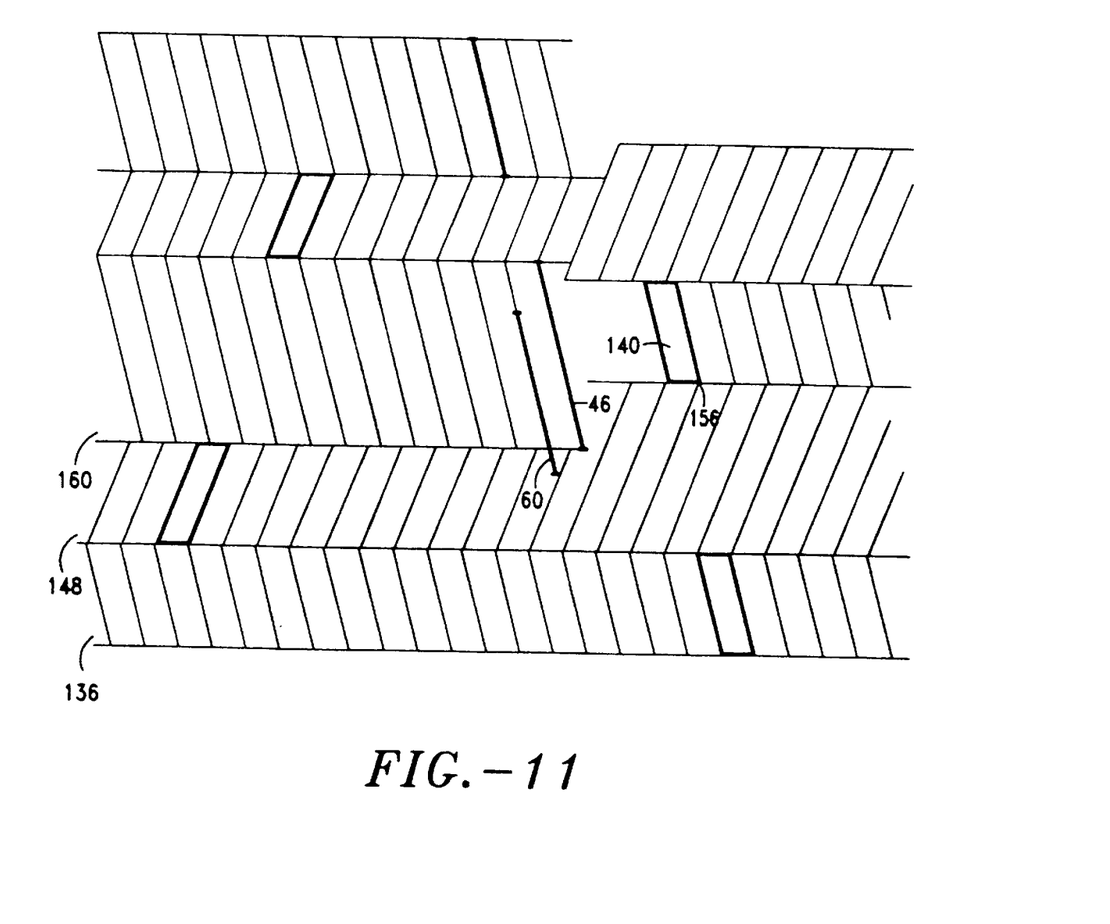
FIG. 11 is a schematic representation of the process of writing a third longitudinal area utilizing a write servo according to the principles of the invention.

Referring to FIGS. 7 and 11, when the area 148 writing is complete and the end of the tape 12 is reached (B32), the magnetic head structure 22 is once again stepped upward a distance of about 1.5 millinches (B34). The write head 46 is enabled, and the head structure 22 is rotated toward the positive azimuth angle θ+ (B36). As was explained for the previous area 148, when the read head 60 receives a signal from the write head 46 at approximately 80% of a full track signal (B 14-B22), the write head 46 is presumably correctly positioned, and writing of data at an azimuth angle θ+ in an area 160 commences (B38). Again, servo blocks like blocks 140 are inserted amidst the area 160 data at pre-determined intervals as indicated by tachometer 28 at the azimuth angle θ+.

It is with the recording of the third area 160 that write servo begins. As can be seen, servo blocks 140 previously recorded in area 136 reside in the path of the write head 46. The lateral position of the lower edges 156 of the servo blocks 140 depend on the lateral position at which the previous area 148 was written. When the tachometer 28 indicates that a servo block is 140 is about to pass under the write head 46 (B40), writing is disabled (B42). The lower edge 156 of the servo block 140 was laterally positioned during the writing of track 148. If the present area 160 is being written such that it is parallel to and abutting the previous area 148, the amplitude of servo information received by the read head 60 as it passes over the servo block 140 will be approximately 50% (according to the head geometries shown). However, if the tape has moved such that the area 160 is being written laterally spaced from the previously written area 148, more of the read head 60 will overlap the servo block 140, so the amplitude of servo information received by the read head 60 as it passes over the servo block 140 will be proportionately greater than 50%. Alternatively, if the tape has moved such that the area 160 is overwriting the previously written area 148, less of the read head 60 will overlap the servo block 140, so the amplitude of servo information received by the read head 60 as it passes over the servo block 140 will be proportionately less than 50%.

Therefore, by monitoring successive servo blocks left in the path of the area 160 during the writing of area 136, the lower edges of which indicate the position of writing of area 148, the position of writing of area 160 can be continuously controlled such that it abuts area 148 by comparing the amplitude of servo information to a reference amplitude and adjusting the position of the write head 46 accordingly. If the amplitude of servo information read exceeds a reference amplitude plus some tolerance ε (B44) as perceived by the servo controller 120, the position of the write head 46 is adjusted downwards (B46). On the other hand, if the amplitude of servo information read falls below a reference amplitude minus some tolerance ε (B48) as perceived by the servo controller 120, the position of the write head 46 is adjusted upwards (B50). Writing of area 160 then resumes (B38). When the end of the tape is reached (B52), the head 22 is stepped a distance equal to the track pitch, and the next area is recorded at a negative azimuth angle −θ according to the write servo method. The process repeats until the entire tape is written.

Though the previous description employs servo blocks whose positions are indicated by a tachometer 28, servo information could alternately be provided in the headers of data blocks written on the tape. In addition, it may be desirable to provide a larger step between area 136 (area 0) and area 148 (area 1), since no servo operates during the writing of area 0 to compensate for lateral tape motion. For example, the head 22 can be stepped 2.5 millinches between areas 136 and 148, while the head 22 is stepped 1.5 millinches between all successive tracks.

It is apparent that, within the scope of the invention, modifications and different arrangements may be made other than as herein disclosed. The present disclosure is merely illustrative, the invention comprehending all variations thereof.

What is claimed is:

1. A method of linear recording on a magnetic medium comprising the steps of:

writing alternate data and servo information in a first longitudinal area on the magnetic medium at a first azimuth angle, the first longitudinal area including a longitudinal gap such that the first longitudinal area comprises a first track and a second track; and writing alternate data and servo information in a second longitudinal area on the magnetic medium at a second azimuth angle, the second longitudinal area including a longitudinal gap such that the second longitudinal area comprises a first track and a second track, the second longitudinal area being written partially over the first longitudinal area such that part of the first track of the first longitudinal area remains on the tape, and the longitudinal gap in the second longitudinal area exposes the alternate data and servo information written in the second track of the first longitudinal area.

2. The method of claim 1 wherein the part of the first track of the longitudinal area remaining on the tape is continuous.

3. A method of linear recording on a magnetic medium minimizing the effects of tracking error comprising the steps of:

writing alternate data and servo information in a first longitudinal area on the magnetic medium at a first azimuth angle, the first longitudinal area including a longitudinal gap such that the first longitudinal area comprises a first track and a second track;

writing alternate data and servo information in a second longitudinal area on the magnetic medium at a second azimuth angle, the second longitudinal track including a longitudinal gap such that the second longitudinal area comprises a first track and a second track, the second area being written partially over the first area such that part of the first track of the first area remains on the tape, and such that the longitudinal gap in the second longitudinal area exposes the alternate data and servo information written in the second track of the first longitudinal area;

writing alternate data and servo information in a third longitudinal area on the magnetic medium at the first azimuth angle, the third longitudinal area including a longitudinal gap such that the third longitudinal area comprises a first track and a second track, the third longitudinal area being written partially over the second longitudinal area such that part of the first track of the second longitudinal area remains on the tape, the first track of the third longitudinal area overlaps the second track of the first area, and such that the longitudinal gap in the third longitudinal area exposes the alternate data and servo information written in the second track portion of the second longitudinal area;

interrupting writing in the third longitudinal area at a position coinciding with servo information from the second track of the first longitudinal area;

reading an amplitude of servo information on the second track of the first longitudinal area;

supplying a reference amplitude indicating a predetermined lateral relationship between longitudinal areas;

comparing the amplitude of servo information from the second track of the first longitudinal area with the reference amplitude;

adjusting the lateral position of writing in the third longitudinal area in response to the comparison when said comparison falls outside a tolerance differential about the reference amplitude to bring the third longitudinal area into the predetermined lateral relationship with the second longitudinal area; and resuming writing in the third longitudinal area.

4. The method of claim 3 wherein the step of adjusting adjusts the lateral position of writing in the third longitudinal area to bring the third longitudinal area into a parallel relationship with the second longitudinal area.

5. An apparatus for linear recording on a magnetic medium comprising:

means for writing alternate data and servo information in a first longitudinal area on the magnetic medium at a first azimuth angle, the first longitudinal area including a longitudinal gap such that the first longitudinal area comprises a first track and a second track; and means for writing alternate data and servo information in a second longitudinal area on the magnetic medium at a second azimuth angle, the second longitudinal area including a longitudinal gap such that the second longitudinal area comprises a first track and a second track, the second longitudinal area being written partially over the first longitudinal area such that part of the first track portion of the first longitudinal area remains on the tape, and such that the longitudinal gap in the second longitudinal area exposes the alternate data and servo information written in the second track of the first longitudinal area.

6. An apparatus for linear recording on a magnetic medium comprising:

means for writing alternate data and servo information in a first longitudinal area on the magnetic medium at a first azimuth angle, the first longitudinal area including a longitudinal gap such that the first longitudinal area comprises a first track and a second track;

means for writing alternate data and servo information in a second longitudinal area on the magnetic medium at a second azimuth angle, the second longitudinal area including a longitudinal gap such that the second longitudinal area comprises a first track and a second track, the second longitudinal area being written partially over the first longitudinal area such that part of the first track of the first longitudinal area remains on the tape, and such that the longitudinal gap in the second longitudinal area exposes the alternate data and servo information written in the second track of the first longitudinal area;

means for writing alternate data and servo information in a third longitudinal area on the magnetic medium at the first azimuth angle, the third longitudinal area including a longitudinal gap such that the third longitudinal area comprises a first lateral track portion and a second track portion, the third longitudinal area being written partially over the second longitudinal area such that part of the first track of the second longitudinal area remains on the tape, the first track of the third longitudinal area overlaps the second track of the first longitudinal area, and such that the longitudinal gap in the third longitudinal area exposes the alternate data and servo information written in the second track of the second longitudinal area;

means for interrupting writing in the third longitudinal area at a position coinciding with servo information from the second track of the first longitudinal area;

means for reading an amplitude of servo information on the second track of the first longitudinal area;

means for comparing the amplitude of servo information from the second track of the first longitudinal area with a reference amplitude;

means for adjusting the lateral position of writing in the third longitudinal area in response to the comparison when said comparison falls outside a tolerance differential about the reference amplitude to bring the third longitudinal area into the predetermined lateral relationship with the second longitudinal area; and means for resuming writing in the third longitudinal area.

7. The apparatus of claim 6 wherein the means for adjusting adjusts the lateral position of writing in the third longitudinal area to bring the third longitudinal area into a parallel relationship with the second longitudinal area.

8. A magnetic tape storage medium having data and servo recorded thereon comprising:

a first longitudinal area including alternate data and servo information written at a first azimuth angle, the first longitudinal area including a longitudinal gap such that the first longitudinal area comprises a first track and a second track; and a second longitudinal area including alternate data and servo information written at a second azimuth angle, the second longitudinal area including a longitudinal gap such that the second longitudinal area comprises a first track and a second track, the second longitudinal area being laterally offset from the first longitudinal area such that part of the first track of the first longitudinal area is not overlapped by the second longitudinal area.

9. The magnetic tape storage medium of claim 8 further comprising:

a third longitudinal area including alternate data and servo information laterally offset from the second longitudinal area such that part of the first track of the second longitudinal area is not overlapped by the third longitudinal area, the first track of the third longitudinal area overlaps the second track of the first longitudinal area.

10. A magnetic tape storage medium having data and servo recorded thereon comprising:

a first longitudinal area including alternate data and servo information written at a first azimuth angle, the first longitudinal area including a longitudinal gap such that the first longitudinal area comprises a first track and a second track; and a second longitudinal area including alternate data and servo information written at a second azimuth angle, the second longitudinal area including a longitudinal gap such that the second longitudinal area comprises a first track and a second track, the second longitudinal area being laterally offset from the first longitudinal area such that a continuous part of the first track of the first longitudinal area is not overlapped by the second longitudinal area;

a third longitudinal area including alternate data and servo information laterally offset from the second longitudinal area such that a continuous part of the first track of the second longitudinal area is not overlapped by the third longitudinal area, the first track of the third longitudinal area overlaps the second track of the first longitudinal area.

* * * * *